US 6,594,980 B2

(12) United States Patent
Oka et al.

(10) Patent No.: US 6,594,980 B2
(45) Date of Patent: Jul. 22, 2003

(54) ROTARY CUTTER HAVING SUSPENSION INCLUDING AIR SPRINGS AND SHOCK ABSORBERS

(75) Inventors: Ken Kengi Oka, St. Catherines (CA); Henry Friesen, Niagara Falls (CA)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/902,526

(22) Filed: Jul. 9, 2001

(65) Prior Publication Data

US 2003/0005677 A1 Jan. 9, 2003

(51) Int. Cl.[7] ............................................. A01D 34/44
(52) U.S. Cl. ............................................. 56/15.8; 56/6
(58) Field of Search .................. 56/17.2, 16.7, 56/DIG. 3, 15.8, 15.6, 15.7, DIG. 22, DIG. 10, 16.9, 6; 280/124.141, 124.179, 124.136, 124.1

(56) References Cited

U.S. PATENT DOCUMENTS

| | | | | |
|---|---|---|---|---|
| 2,502,309 A | * | 3/1950 | Byrd | 244/109 |
| 3,334,476 A | * | 8/1967 | Engler | 280/79 |
| 3,479,049 A | * | 11/1969 | Duecy | 180/41 |
| 3,940,161 A | * | 2/1976 | Allison | 280/124.108 |
| 4,178,005 A | * | 12/1979 | Kent, Jr. | 172/417 |
| 4,948,162 A | * | 8/1990 | McCanse | 267/41 |
| 6,170,242 B1 | * | 1/2001 | Gordon | 280/124.141 |
| 6,244,025 B1 | * | 6/2001 | Ferris et al. | 56/15.8 |

OTHER PUBLICATIONS

Bush Hog 2615L, 2610L Flex–wing Rotary Cutter Operator's Manual, pp. 1, 14–17 and 29, Jun. 1995.*
Bush Hog Advertising Brochure for Series 2610, 3610 and 2614 Rotary Cutter, undated but disclosing matter developed prior to the present invention, both sides of coversheet.
Woods Advertising Brochure for Model 214 Rotary Mower–Shredder, dated Apr., 1985, inside middle and end of three–section fold–out page.

* cited by examiner

Primary Examiner—Thomas B. Will
Assistant Examiner—Meredith Petravick

(57) ABSTRACT

A flex wing rotary cutter includes wheel axles on each of the center and wing deck frames which are linked together for simultaneous rocking by a lift cylinder coupled between the center deck frame and the center axle. Each of the support wheels of the cutter is mounted to a spindle carried at the rear end of a rocker arm that is pivotally attached, at a location between its ends, to a rear location of a respective strut cantilevered from one or the other of the axles. An air spring is coupled between the strut and a forward end of the rocker arm and a shock absorber is coupled between the rocker arm and the strut at a location between the air spring and the connection of the rocker arm with the strut.

8 Claims, 3 Drawing Sheets

ROTARY CUTTER HAVING SUSPENSION INCLUDING AIR SPRINGS AND SHOCK ABSORBERS

FIELD OF THE INVENTION

The present invention relates to a rotary cutter and more specifically relates to a suspension for the support wheels of flex wing and rigid body rotary cutters.

BACKGROUND OF THE INVENTION

Rotary cutters are often towed across rough terrain which results in the cutter bouncing such that an uneven cut results, with high shock loads being transmitted to the machine and towing tractor. It is known practice to equip rotary cutters with wheels mounted to axle arms that are cushioned by coil compression or cylindrical rubber springs. Stiff and/or short deflection springs are utilized to prevent excessive bouncing, thus sacrificing softness which is required to reduce high dynamic loading. Additionally, the known suspension arrangements have not been able to compensate for various wheel reactions across the width of the machine and still maintain acceptable performance, this problem being especially acute with flex wing cutters where, due to the weight of the drives and their supports, the center axle carries higher loads than the wing axles.

SUMMARY OF THE INVENTION

According to the present invention, there is provided an improved suspension arrangement for a rotary cutter.

An object of the invention is to provide a suspension arrangement that results in softness, without excessive bounce, so as to reduce shock loading into the mower and tractor while maintaining an even cut.

A further object of the invention is to provide a suspension which is easily adjustable for compensating for additional loading.

A more specific object of the invention, is to provide a suspension arrangement which achieves the objects mentioned above by utilizing bellow type air springs having inherent damping.

Yet another specific object of the invention is to provide air springs, as mentioned in the immediately preceding object, which are arranged so as to independently cushion each axle so as to optimize the ride on each machine segment.

A further object of the invention, is to use a shock absorber in conjunction with each air spring provided according to one or more of the previous objects.

These and other objects will become apparent from a reading of the following description together with the appended drawings.

DESCRIPTION OF THE PREFERRED EMBODIMENT

Figure 1:
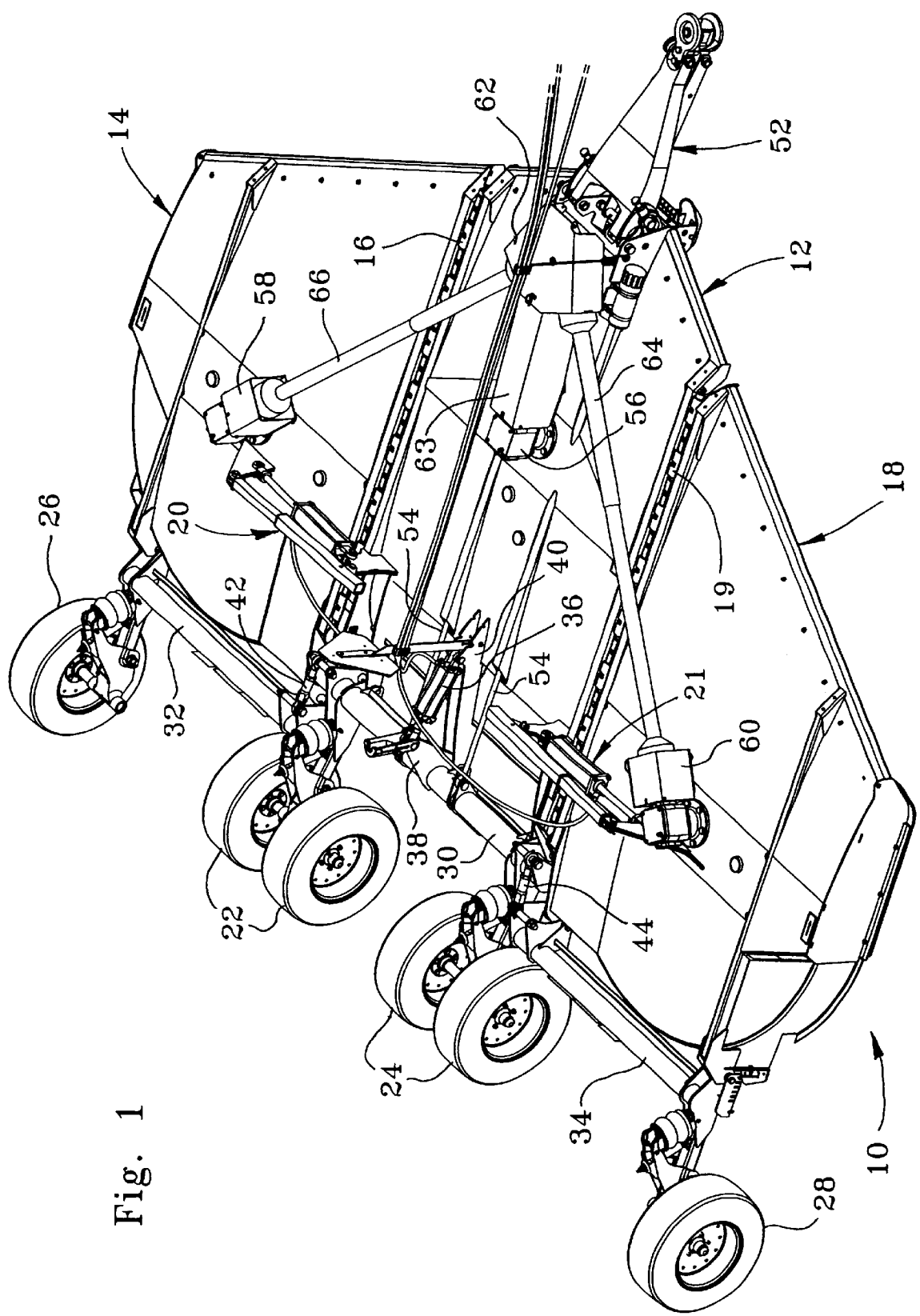
FIG. 1 is a right front perspective view of a flex wing rotary cutter equipped with a suspension arrangement constructed in accordance with the principles of the present invention.

Referring now to FIG. 1, there is shown a flex wing rotary cutter 10 comprising a deck including a middle section 12, having a left wing 14 coupled to a left edge thereof by a fore-and-aft extending hinge 16, and having a right wing 18 coupled to right edge thereof by a fore-and-aft extending hinge 19. A left wing lift cylinder and strut assembly 20 is coupled between the middle section 12 and the left wing 14 for controlling lifting and lowering of the latter. Similarly, a right wing lift cylinder and strut assembly 21 is coupled between the middle section 12 and the right wing 18.

The deck is supported for being pulled over the terrain by a plurality of ground wheels including left and right pairs of tandem wheels 22 and 24, and left and right outer wheels 26 and 28. The pairs of tandem wheels 22 and 24 are respectively mounted to left and right ends of a center frame axle 30 which is rotatably mounted in spaced brackets fixed to rear locations of the top of the mower deck middle section 12. The left outer wheel 26 is mounted to the left end of a left wing axle 32 rotatably mounted in brackets fixed to spaced rear locations of the deck left wing 14, while the right outer wheel 28 is similarly mounted to the right end of a right wing axle 34 rotatably mounted in brackets fixed to spaced rear locations of the deck right wing 18.

Figure 2:
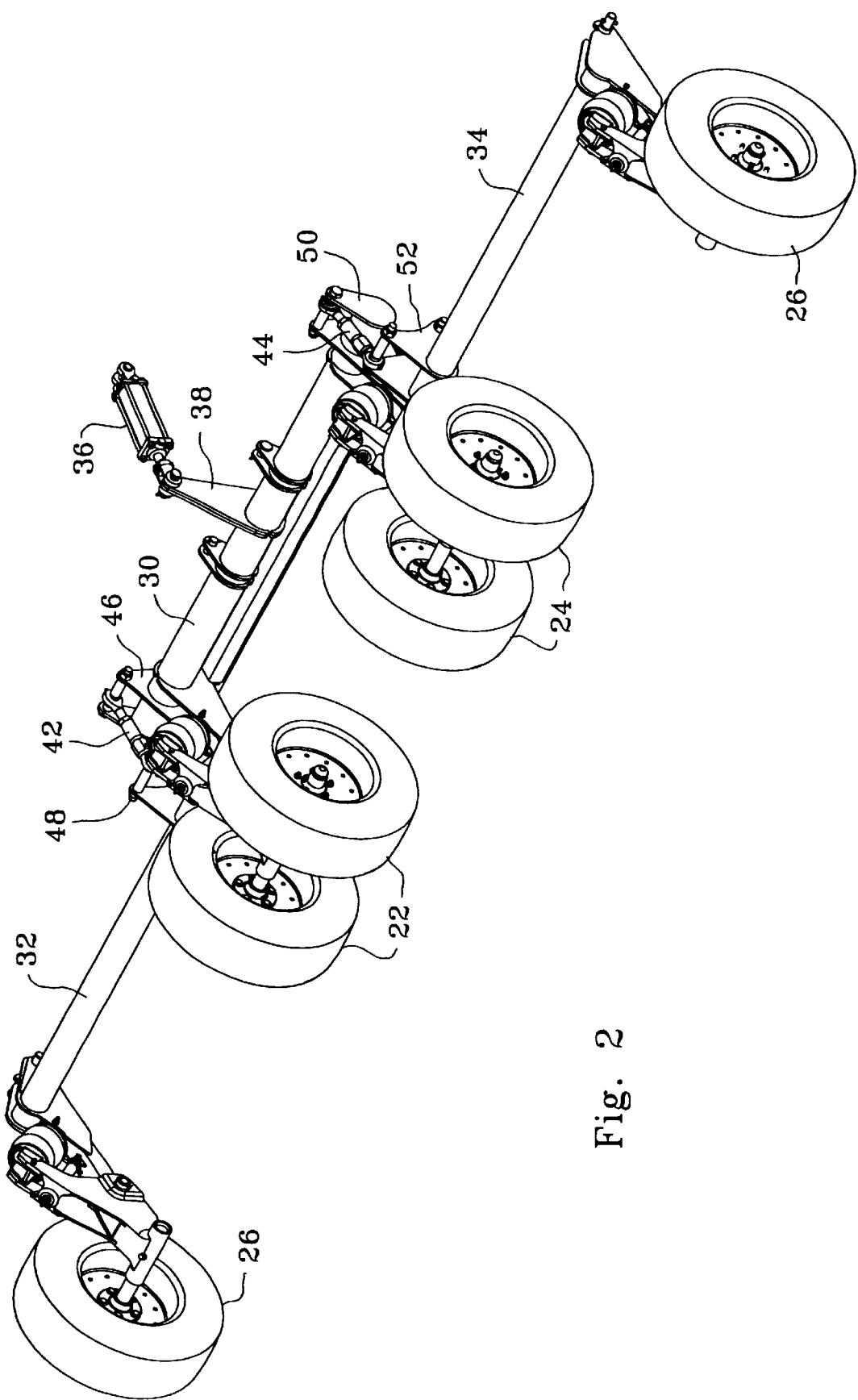
FIG. 2 is an enlarged right rear perspective view of the axle assembly shown in FIG. 1 including the suspension arrangement.

Provided for effecting pivotal movement of each of the axles 30, 32 and 34 is an extensible and retractable hydraulic lift cylinder 36 coupled between an arm 38 fixed to the middle of the center frame axle 30 and a bracket 40 fixed to the top of the middle deck section 12. Referring now also to FIG. 2, it can be seen that rocking movement of the axle 30 is transferred to the right and left hand axles 32 and 34 by right and left links 42 and 44, each being in the form of a turnbuckle having ball couplers at its opposite ends, with the link 42 being coupled between a bracket 46, provided at the left end of the center frame axle 30, and a bracket 48 provided at the right end of the left wing axle 32; and with the link 44 being coupled between a bracket 50 provided at the right end of the center frame axle 30 and a bracket 52 provided at the left end of the right wing axle 34.

A hitch assembly 52 is mounted to the front end of the center deck section 12 and has leveling rods 54 coupled between it and the center frame axle 30, in a known manner not shown, for effecting a self-leveling of the hitch assembly 52 in response to operation of the lift cylinder 36.

Located beneath each of the middle deck section 12 and the wings 14 and 18 is a cutter blade (not shown). The middle blade is connected to a spindle coupled for being driven from the output of a center gear box 56, which is mounted to a center location of the top of the middle deck section 12, while the left and right blades are respectively connected to respective spindles coupled for being driven from the output of left and right gear boxes 58 and 60 mounted to central top locations of the left and right wings 14 and 18. A power splitter box (not shown) located beneath a shield 62 is coupled to a shaft, located under a shield 63 and coupled to the input of the center gear box 56, and is further coupled to right and left, telescopic drive shafts 64 and 66, respectively, coupled to the inputs of the right and left gear boxes 58 and 60. The power splitter box would receive its power from a drive shaft coupled between the tractor power take-off shaft and an input shaft of the power splitter box.

Figure 3:
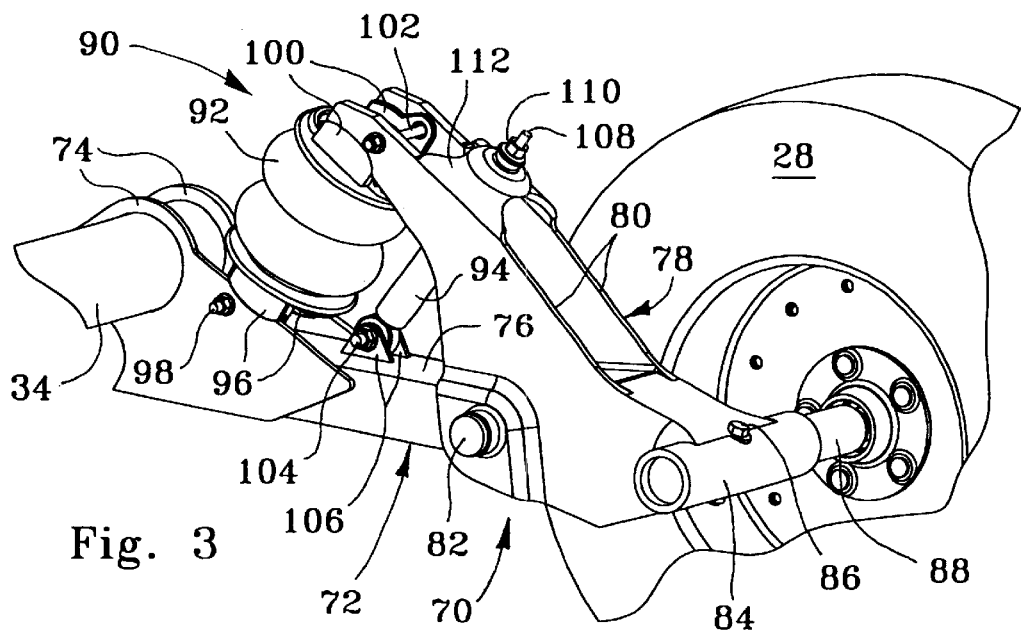
FIG. 3 is a left rear perspective view of the right-hand wing support wheel and its suspension.

Referring now also to FIG. 3, it can be seen that each of the wheels 22, 24, 26 and 28 are mounted in a similar fashion, with only a mounting assembly 70 of the right wheel 28 being described in detail. The assembly 70 includes an axle strut 72 having a forward end defined by a pair of parallel plates 74 welded to opposite sides of a forward end of a square tubular member 76. The plates 74 are provided with cylindrical openings receiving the right end of the right wing axle 34, with the plates 74 being welded in place on the axle 34 so that the tubular member 76 projects to the rear. A generally triangular rocker arm 78 is formed of a pair of spaced parallel plates 80 and includes front, intermediate and rear corners, as considered in the fore-and-aft direction. A rear end portion of the strut tubular member 76 is received between the plates 80 and coupled to the intermediate corner of the rocker arm 78 by a rocker arm pivot pin 82. Defining the rear corner of the rocker arm 78 is a cylindrical tube 84 fixed to and extending beyond both plates 80. Received in the tube 84 and fixed in place by a through bolt 86 is a spindle 88 on which the wheel 28 is rotatably mounted.

Movement of the rocker arm 78 as caused by the wheel 28 moving over uneven terrain is cushioned by a suspension assembly 90 including an air spring 92, having a bellows construction, and a shock absorber 94.

The air spring 92 has a bottom end defined by a casting having a base from which a pair legs 96 depend, the legs 96 having parts that extend over upper edges of the strut plates 74 and lower parts that are received between, and pivotally coupled to, the plates 74 by a pivot bolt 98. Similarly, the upper end of the air spring 92 is defined by a casting having a base from which a pair of legs 100 project upward, the legs 100 having parts that extend under the rocker arm plates 80 and other parts that extend between, and are pivotally coupled to, the plates 80 by a pivot bolt 102.

The shock absorber 94 is oriented in approximate parallel relationship to the air spring 92 and includes a coupler at its cylinder end which is received between, and coupled, as by a pivot bolt 104, to a pair of lugs 106 fixed to a top surface of the tubular member 76 of the strut 72 at a location to the rear of the air spring 92. The shock absorber 94 includes a piston rod 108 secured, as by a nut 110, to a bridge plate 112 extending between and welded to the rocker arm plates 80 at a location rearward of the pivot bolt 102.

Figure 4:
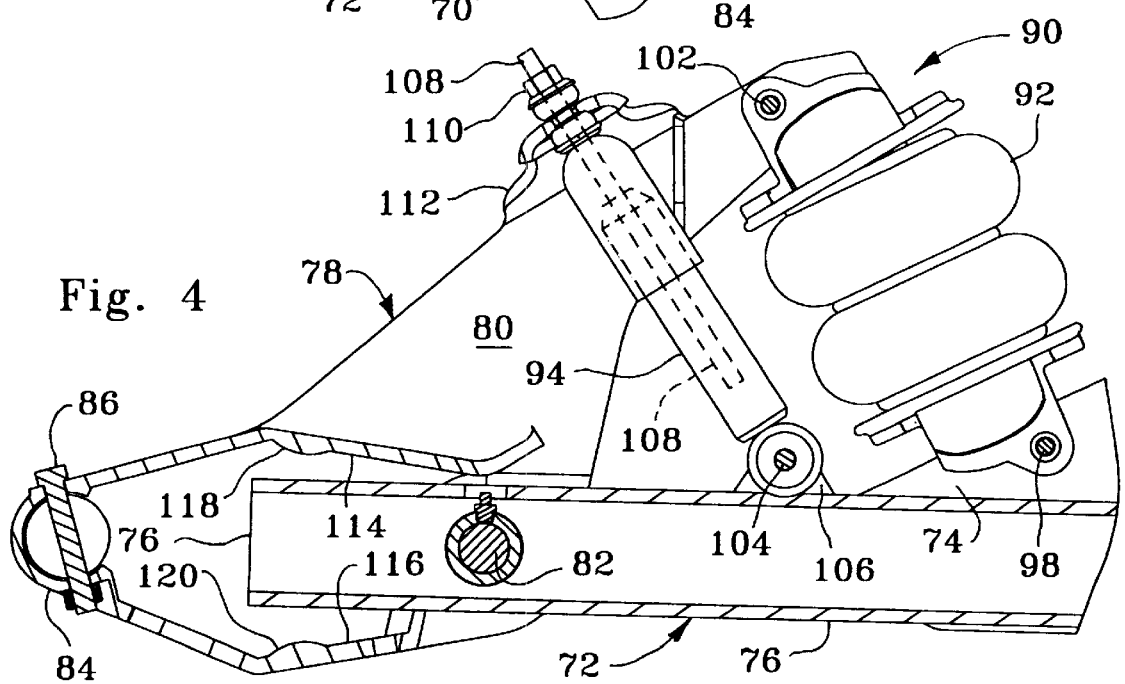
FIG. 4 is a longitudinal vertical sectional view of the rear portion of the suspension for the wheel of the right-hand wing.

Referring now to FIG. 4, it can be seen that the tubular member 76 of the axle strut 72 has a rear end that terminates approximately half way between the rocker arm pivot pin 82 and the tube 84 at the rear of the rocker arm 78. Stiffening webs 114 and 116 extend between the plates 80 of the rocker arm 78 at respective locations above and below the tubular member 76 of the axle strut 72. The upper stiffener web 114 is provided with a transverse, downwardly curved surface section defining an upper limit stop 118; and the lower stiffener web 116 is provided with a transverse, upwardly curved surface section defining a lower limit stop 120. Thus, as the rocker arm 78 pivots counterclockwise about the pivot pin 82, as viewed in FIG. 4, the upper limit stop 118 will come into engagement with an upper surface location of the rear part of the strut tubular member 76. Similarly, the lower limit stop 120 will come into engagement with a lower surface location of the member 76 as the rocker arm 78 pivots clockwise about the pivot pin 82. The stops 118 and 120 are approximately 25° to the opposite sides of a horizontal line passing through the axes of the pivot pin 82 and of the cylindrical tube 84.

Figure 5:
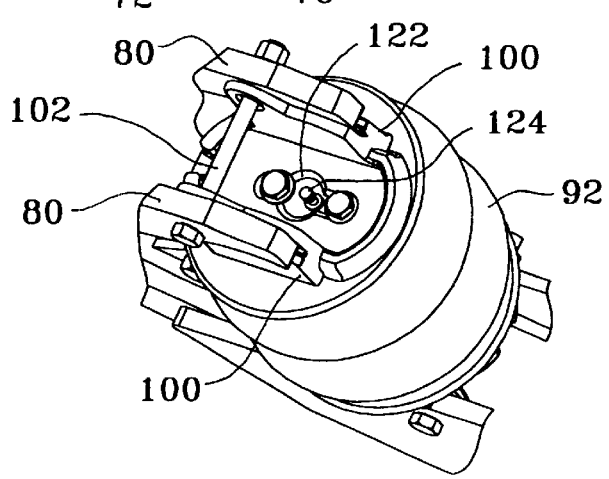
FIG. 5 is a right top perspective view showing the structure mounting the top of one of the air springs to the associated rocker arm.

Referring now to FIG. 5, it can be seen that the base of the casting from which the legs 100 project at the top of the air spring 92 is provided with an opening 122 so as to provide access to a capped valve stem 124 of the air spring 92.

The operation of the rotary cutter 10 with its suspension arrangement comprising a plurality of suspension assemblies, like the suspension assembly 90, is as follows.

Preliminarily its is noted that, while the air springs 92 are all of identical construction, those associated with the middle axle 30 will normally be pressurized to an amount greater than those associated with the wing axles 32 and 34, with the increased pressure being required for balancing the extra weight of the middle deck section 30. Further, it is to be noted, that while the air springs 92 are preferred because of the ease with which their internal pressure, and hence their spring constant can be changed, and because of their inherent ability to absorb shocks, it is also possible to use an elongate compression spring and shock arrangement having an adjuster for selectively adjusting the compression spring pre-load so as to increase or decrease the resistance to the downward movement of the rocker arm 78.

After the rotary cutter 10 is towed to a location where it is desired to cut vegetation, the hydraulic cylinder 36 is retracted so that the middle axle 30 is rotated so as to cause the axle struts 72, and hence the attached wheels 22 through 26 to be elevated relative to center frame 12 and wings 14 and 18. The cutter 10 is then towed over the terrain with the wheels 22–26, and their associated rocker arm 78, swinging upwardly about the associated pivot pin 82. This upward movement of the rocker arm 78 about the pivot pin 82 will be resisted and cushioned by the air spring 92. The air spring 92 has an inherent damping characteristic which works to dampen the rebound of the air spring 92. Additional dampening is provided by the shock absorber 94. The action of the air spring 92 in combination with the shock absorber 94 allows for greater suspension travel and softness without excessive bounce, thus reducing shock loading into the mower 10 and towing tractor while maintaining an even cut. Pivoting of the rocker arm 78 to positions beyond extremes of the operational limit of the air spring 92 or the shock absorber 94 is prevented by the upper limit stop 118 and the lower limit stop 120.

In view of the described the preferred embodiment, it will become apparent that various modifications can be made without departing from the scope of the invention as defined in the accompanying claims.

What is claimed is:

1. In a rotary cutter including at least a central frame having an axle mounted to a rear location thereof for pivoting about a transverse axis and a suspension arrangement coupling at least one wheel to the axle, the improvement comprising: said suspension arrangement including a strut fixed to and extending to the rear from said axle; a rocker arm having front and rear ends and mounted at a location between them to said strut for pivoting about a second axis extending parallel to said transverse axis; a spindle having said at least one wheel mounted thereto, with the spindle being mounted to said rear end of said rocker arm; said rocker arm including a pair of spaced plates located on opposite sides of said strut; an upper limit stop joined to said rocker arm in a location for contacting a top location of said strut for limiting the amount of downward movement said rear end of the rocker arm may undergo relative to said strut; a lower limit stop joined to said rocker arm in a location for contacting a bottom location of said strut for limiting the amount of downward movement said front end of said rocker arm may undergo relative to said strut; and an air spring being mounted between said second end of said rocker arm and said strut.

2. The rotary cutter as defined in claim 1 wherein said air spring includes an air valve through which air may be introduced or vented for changing the spring constant of the air spring.

3. The rotary cutter as defined in claim 1 wherein said rocker arm includes upper and lower stiffener ribs respectively extending between said pair of spaced plates at locations above and below said strut, with said upper limit stop being defined by a transverse, downwardly curved surface of said upper stiffener rib and with said lower limit stop being defined by a transverse, upwardly curved surface of said lower stiffener rib.

4. In a rotary cutter including at least a central frame having an axle mounted to a rear location thereof for pivoting about a transverse axis and a suspension arrangement coupling at least one wheel to the axle, the improvement comprising: said suspension arrangement including a strut fixed to and extending to the rear from said axle; a rocker arm having front and rear ends and mounted at a location between them to said strut for pivoting about a second axis extending parallel to said transverse axis; a spindle having said at least one wheel mounted thereto, with the spindle being mounted to said rear end of said rocker arm; said rocker arm being generally triangular in side view, and including a front corner coupled to an upper end of said air spring, a middle corner coupled to said strut, and a rear corner defined by a cylindrical tube having said spindle received and fixed therein; and an air spring being mounted between said second end of said rocker arm and said strut.

5. In a rotary cutter including at least a central frame having an axle mounted to a rear location thereof for pivoting about a transverse axis and a suspension arrangement coupling at least one wheel to the axle, the improvement comprising: said suspension arrangement including a strut fixed to and extending to the rear from said axle; a rocker arm having front and rear ends and mounted at a location between them to said strut for pivoting about a second axis extending parallel to said transverse axis; a spindle having said at least one wheel mounted thereto, with the spindle being mounted to said rear end of said rocker arm; an air spring mounted between said second end of said rocker arm and said strut; and a shock absorber having upper and lower ends respectively connected to said strut and said rocker arm at locations spaced rearwardly of upper and lower ends of said air spring.

6. The rotary cutter as defined in claim 5 wherein said air spring includes an elastomeric, bellows-like body.

7. A rotary cutter having a central deck frame having a wheel support axle coupled thereto for oscillating about a transverse axis; a strut fixed to and extending rearwardly from said axle; a rocker arm having front and rear ends and being vertically pivotally mounted to said strut at a location between said front and rear ends; a spindle being fixed to said rear end of said rocker arm; a wheel being mounted for rotation about said spindle; a compression spring member being coupled between said rocker arm and said strut and being adjustable for varying a force exerted thereby in opposition to said front end of said rocker arm moving downward toward said strut; and a shock absorber being mounted between said strut and rocker arm in parallel with said compression spring member.

8. The rotary cutter defined in claim 7 wherein said compression spring member is defined by an air spring having an elastomeric body; and an air valve coupled to said body for allowing air to be introduced into, or exhausted from, said body to thereby change the spring constant in said air spring.

* * * * *